United States Patent [19]
Kick et al.

[11] Patent Number: 5,495,242
[45] Date of Patent: Feb. 27, 1996

[54] SYSTEM AND METHOD FOR DETECTION OF AURAL SIGNALS

[75] Inventors: James Kick, Ellisville, Mo.; William D. McConnell, Garland, Tex.

[73] Assignee: C.A.P.S., Inc., Fenton, Mo.

[21] Appl. No.: 106,615

[22] Filed: Aug. 16, 1993

[51] Int. Cl.⁶ .................................................. G08G 1/00
[52] U.S. Cl. .......................................... 340/902; 340/906
[58] Field of Search ...................................... 340/901, 902, 340/906, 907, 904; 381/56; 367/199

[56] References Cited

U.S. PATENT DOCUMENTS

| | | | |
|---|---|---|---|
| 3,430,195 | 2/1969 | Castlen | 340/902 |
| 4,209,769 | 6/1980 | Chronerberry | 340/902 |
| 4,587,522 | 5/1986 | Warren | 340/902 |
| 4,625,206 | 11/1986 | Jensen | 340/902 |
| 4,747,064 | 5/1988 | Johnston | 340/906 |
| 4,785,474 | 11/1988 | Bernstein et al. | 340/902 |
| 4,806,931 | 2/1989 | Nelson | 340/902 |
| 4,952,931 | 8/1990 | Serageldin et al. | 340/902 |
| 5,046,127 | 9/1991 | Luber et al. | 340/902 |
| 5,287,411 | 2/1994 | Hill et al. | 340/902 |

*Primary Examiner*—Brent A. Swarthout
*Attorney, Agent, or Firm*—Polster, Lieder, Woodruff & Lucchesi

[57] ABSTRACT

An early warning system (10) for visually informing the hearing impaired driver (D) of an automotive vehicle (A) of the proximity of an emergency vehicle by detecting a siren being sounded by the emergency vehicle. A microphone unit (12) receives an audible frequency signal transmitted by the siren. This signal is in one of a band of audible frequencies. In addition to the siren, the microphone unit receives other audible frequency signals as well. A signal processor (22) processes all received audible frequency signals. The processor includes an analog-digital converter (30) for converting received signals to a digital signal. The processor further includes a correlator microprocessor (32) for comparing the resulting processed signal to known siren signal characteristics each of which identifies a different type of siren. A light indicator (D1) provides a visible signal to the driver of the proximity of an emergency vehicle and an audible warning is also provided. These warnings allow the driver time to take appropriate action to avoid the emergency vehicle. The indicator is illuminated when a correlation is found indicating a received signal corresponds with the sound made by an emergency vehicle siren.

33 Claims, 8 Drawing Sheets

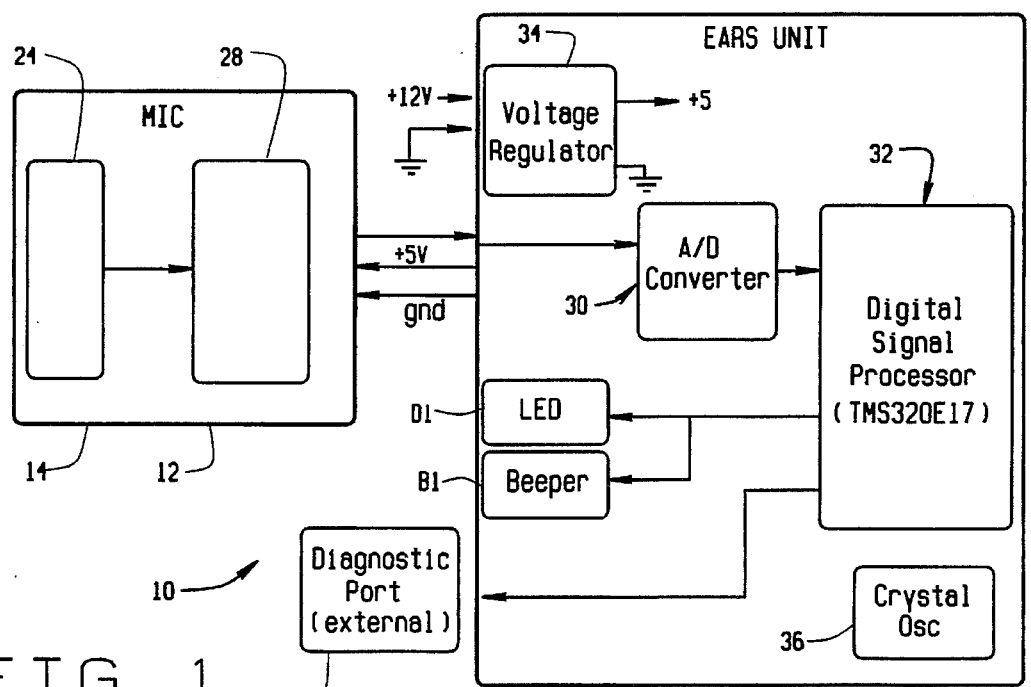
FIG. 1
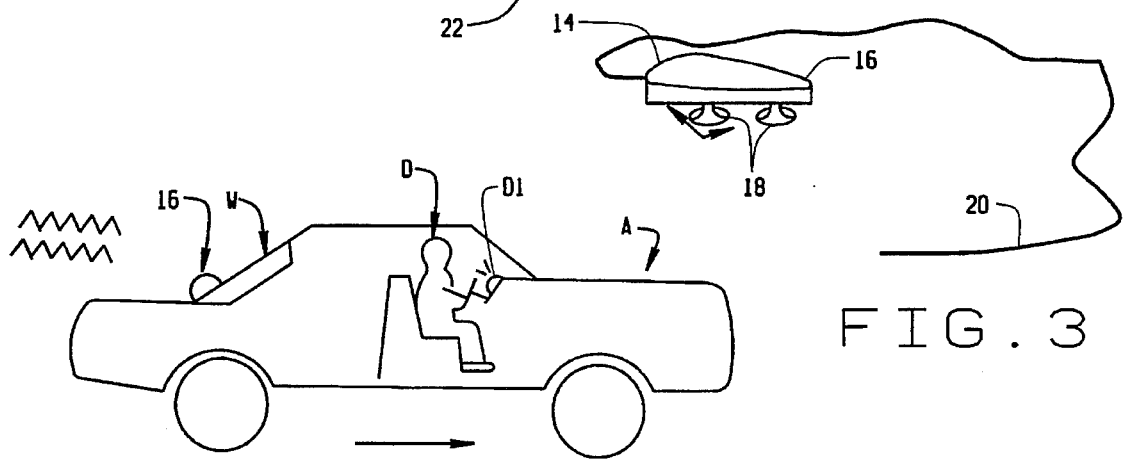
FIG. 3
FIG. 2
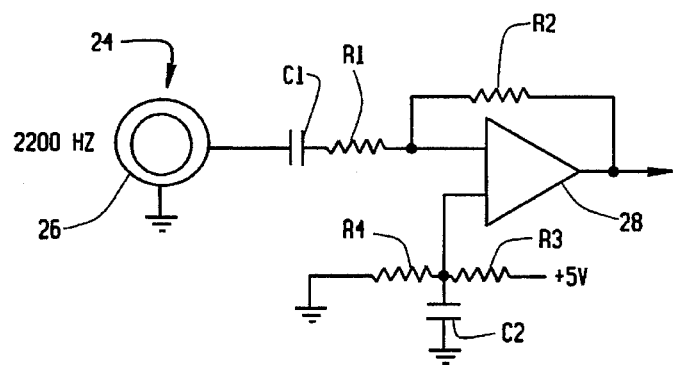
FIG. 4

SYSTEM AND METHOD FOR DETECTION OF AURAL SIGNALS

BACKGROUND OF THE INVENTION

This invention relates to a system and method for detection of aural signals, and more particularly to an alert system for use by audio impaired automobile drivers which is responsive to an alarm siren sounded by an emergency vehicle to warn the hearing impaired driver so he can take appropriate action. The invention further relates to traffic light pre-emption by which an emergency vehicle, by rounding its siren as it approaches an intersection, causes the light to stop other vehicular traffic while providing a right-of-way to the emergency vehicle.

Many individuals who are hearing impaired are fully competent to drive an automobile, truck, or other vehicle. And, many of these people do drive. In normal circumstances, the visual aids such as street signs, traffic lights, road markings, etc., enable these people to drive safely. One situation however, is particularly dangerous to these persons. That is the presence of emergency vehicles carrying out their tasks. Police cars, fire trucks, ambulances all have both warning lights and sirens. Also for non-hearing impaired drivers, driving a car with the windows rolled up with the air conditioner blower on high, and with the radio on, it is also difficult for such persons to hear emergency vehicle warning sirens. While such drivers may see the flashing lights these emergency vehicle use in a time of emergency, in many emergency situations, such drivers are not able to see an emergency vehicle approaching and take appropriate action to avoid injury to himself and others. Enough situations arise where the emergency vehicle's flashers cannot be seen by the hearing impaired driver (the vehicle is approaching from a side street, or from an approach ramp above or below the driver's field of vision) that tragic consequences result.

While the problem is understood, a solution is not obvious. In any alarm system, there are at least two goals which must be met. One is that the probability of detecting the dangerous condition is high. The second is that the probability of false alarms is low. For example, it would appear simple, at first glance, to have some type of audio sensor which is responsive to a siren and provide a light indication readily recognizable by the driver when the sensor picks up an approaching siren. However, there are many different types of sirens and they do not have common characteristics. A major difference between them is the time-frequency pattern of their audio output; e.g., their rising/lowering pitch over time. One siren, for example, has a smoothly rising and falling pitch with a 4–5 second cycle time. A second siren has the same frequency variations as the first, but a much shorter cycle time (⅓ sec.). A third siren cycles between two frequencies every one-half second, with a fourth siren doing this at an even faster rate. As a result, a simple pattern matching technique cannot be used.

A second problem is with the sensor itself, which is some type of microphone or other audio receiver. Some microphones work well for one siren but not others. Others work better in open areas, other in more confined urban areas such as downtown areas with tall buildings. In this latter regard, tall structures produce echoes, and their resulting acoustic effect, together with that caused by wind, trees, hills, automobile vibrations, etc. may cause the critical frequencies to be washed out. Other effects include in-band noise and harmonic distortions. With respect to wind, wind generated noise can obliterate all but the loudest siren noises; i.e., those sounds which are 95dB or less. Overall, there is a need for an alert system for the hearing impaired which is able to detect any siren in use, do so in any area where the driver may go, and do so quickly enough that the driver can take the correct evasive action.

SUMMARY OF THE INVENTION

Among the several objects of the present invention may be noted the provision of a system and method for detection of aural signals (e.g., a warning siren) for use by hearing impaired as well as normal hearing drivers of automotive vehicles; the provision of such a system employing digital signal processing technology to analyze and categorize received sounds to detect the presence of a siren; the provision of such a system which is portable, yet readily installed on a vehicle, and which provides a clear visual or other indication to the driver; the provision of such a system which provides an indication in ample time to allow the driver to take appropriate action; the provision of such a system which detects any of many different sirens (including WAIL, YELP, HYPERYELP, HI-LO, and PHASOR) used by different emergency vehicles; the provision of such a system which employs a microphone relatively immune to turbulence and which is installed so to be largely protected from vehicle vibrations; the provision of such a system employing a spectral averaging process to enhance the signal-to-noise of detected siren sounds to better obtain a warning and prevent false alarms; the provision of such a system which continuously examines different frequency bands to ascertain if a siren is in the vicinity of the vehicle; the provision of such a system which is reliable in operation which has a long service life, which is easy to install on a variety of vehicles and which is of relatively low cost; and, the provision of such a system which is adaptable for use on traffic signals such as stop lights whereby the stop light is responsive to the siren sound of an approaching emergency vehicle to stop vehicular traffic and yield right-of-way to the vehicle.

Generally stated, a system is provided for visually informing a hearing impaired or other driver of an automotive vehicle of the proximity of an emergency vehicle. This is done by detecting a siren being sounded by the emergency vehicle. A microphone unit receives an audible or aural frequency signal generated or transmitted by the siren. This signal is in one of a band of audible frequencies. In addition to detecting siren warning signals, the microphone unit may detect other audible frequency signals as well. A signal processor processes all received audible frequency signals. The processor includes an analog-digital converter for converting received signals to a digital signal. A digital signal processing (DSP) portion of the processor further includes an algorithm for analyzing the resulting digital signal for periodicity. A light indicator provides a visible signal to the driver of the proximity of an emergency vehicle. The indicator is illuminated when the analysis indicates a received signal corresponds with the sound made by an emergency vehicle siren. Other objects and features will be in part apparent and in part pointed out hereinafter.

BRIEF DESCRIPTION OF THE DRAWINGS

FIG. 1 is a block diagram of an aural signal detection system of the present invention;

FIG. 2 is a representation of an automotive vehicle with the system installed;

FIG. 3 is an illustration of a microphone/pre-amplifier installation on the vehicle;

FIG. 4 is a schematic of a pre-amplifier used with the microphone to perform initial signal conditioning of a siren signal;

Corresponding reference characters indicate corresponding parts throughout the drawings.

DESCRIPTION OF A PREFERRED EMBODIMENT

Figure 5:
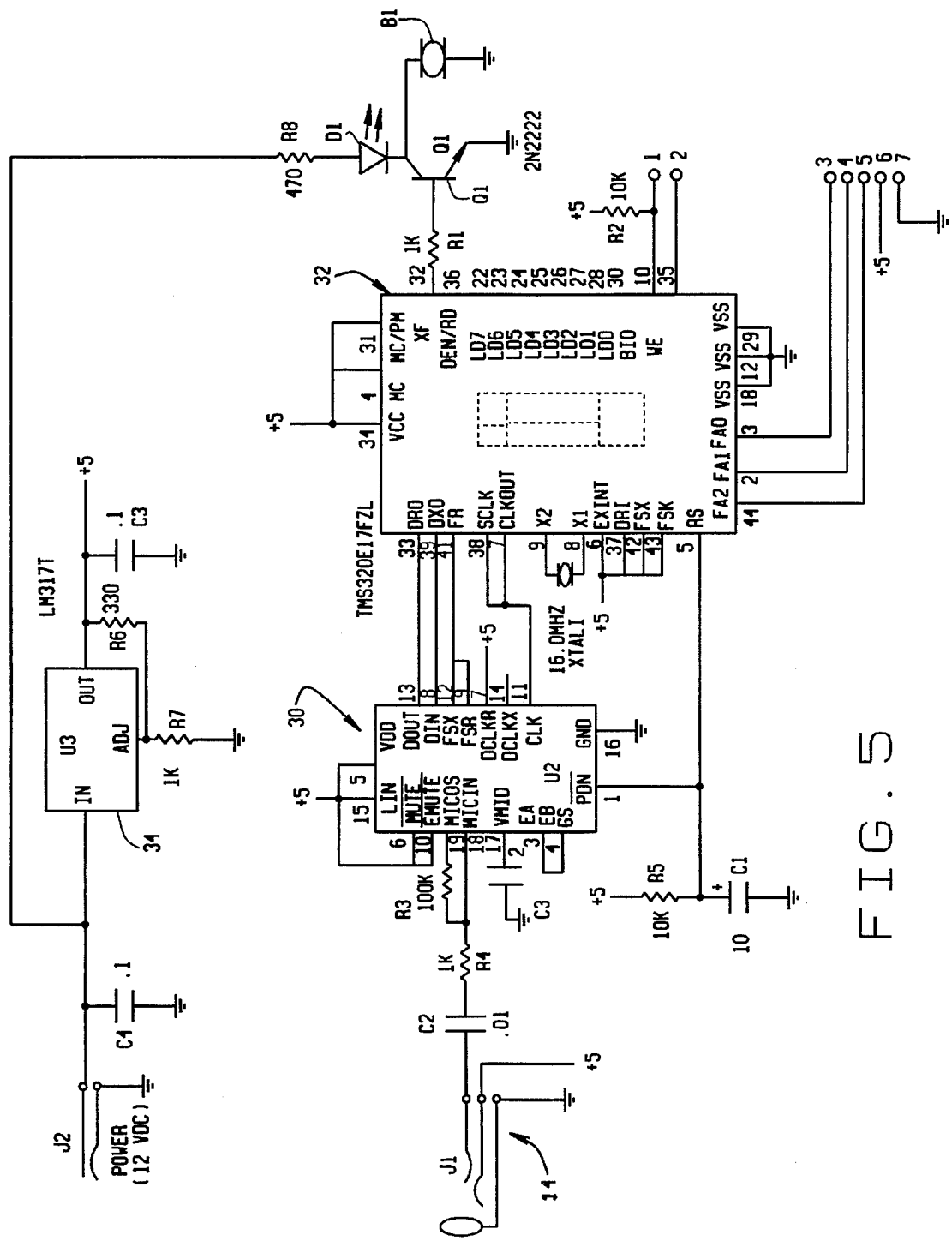
FIG. 5 is a schematic of the signal processing and illumination control circuitry of the system.

Referring to the drawings, an early warning system for visually informing hearing impaired or other drivers of automobiles (or other vehicles) is indicated generally 10. As indicated in FIG. 2, a hearing impaired or non-hearing impaired driver D may otherwise be fully capable of driving an automobile A or similar vehicle. A concern with these type drivers is their inability (due either to being physically hearing impaired or due to noise within the automobile) to hear a siren sounding the approach of an emergency vehicle. If the police car, fire truck, ambulance, etc., is in plain sight of the driver, the vehicle's flashing lights are probably sufficient to warn the driver so the driver can take appropriate action. However, if the vehicle is approaching from a cross street, where trees or buildings may block its view by the driver; or if it is coming up or going down a ramp, a driver may not be aware of its proximity until it is too late to avoid an accident. By providing a visual indication to the hearing impaired driver when system 10 detects a siren, potentially tragic consequences are avoided.

System 10 first includes a means 12 for receiving an audible (aural) frequency signal transmitted by a siren. It will be understood that there are a variety of sirens used by emergency vehicles and each siren has a separate set of frequency characteristics. Accordingly, means 12 includes a microphone 14 capable of receiving frequency signals throughout the audio frequency bands. Of course, the microphone will also receive other audio frequency signals. System 10 operates to distinguish any siren sound from the other received signals. Microphone 14 is installed on automobile A. Again as seen in FIG. 2, the microphone is installed on the exterior of the vehicle. A particular problem with mounting a microphone on the exterior is the excessive amount of wind turbulence noise which is generated when the vehicle is in motion, even when the vehicle is traveling as slowly as 10 mph. At normal street and highway speeds, wind generated noise obliterates all but the loudest sirens; i.e., sirens whose sound is greater than 95dB.

To provide an audio receiver compatible with system 10, it has been found best to place the microphone in a rear position on the vehicle; rather than, for example, on the roof of the vehicle. By positioning the microphone on the lower back window of the vehicle, there is not only less wind turbulence, but there is also less vehicle vibration pick-up than if the microphone is placed on metal portions of the car such as the trunk lid or rear bumper area of the automobile. Thus, as shown in FIG. 2, microphone 14 is located on the rear window W of the automobile. Further, as shown in FIG. 3, the microphone is installed in a housing or box 16 which is mounted on the rear window using, for example, suction cups 18. Though not shown, a dome may be placed over housing 16 to help reduce noise created by wind turbulence. An electrical cable 20 extends from the microphone to an electronics portion of the system. The cable is used to route power to the microphone, and the audio signals received by the microphone to a signal processing means 22 of system 10.

Receiving means 12, in addition to the microphone further includes frequency sensing means 24. As shown in FIG. 4, means 24 includes a piezoelectric transducer 26 which is resonant at an audio frequency of, for example, 2200 Hz. Receiving means 12 also includes an inverted gain operational amplifier 28 to which the output of transducer 26 is supplied. Transducer 26 provides a signal to the inverting input of the amplifier through a filter capacitor C1 and a resistor R1. The amplifier includes a feedback resistor R2. A bias voltage level is applied to the non-inverting input of amplifier 28 through a voltage divider network comprising resistors R3 and R4, and a capacitor C2. The output of amplifier 28 is the input frequency signal to processing means 22. Both transducer 26 and amplifier 28 are installed in housing 16.

Referring to FIGS. 1 and 5, signal processing means 22 includes an analog-to-digital converter 30 for converting received audio signals to a corresponding digital signal. As described hereinafter, once the conversion from analog to digital is complete, a digital signal processor 32 (referred to as "DSP") performs an autocorrelation of the resulting digital signal with itself. This process reveals periodicities within the received signal with respect to its frequency-time characteristics. A power supply 34 converts the 12 VDC automobile battery voltage to a 5 VDC level used by converter 30 and microprocessor 32. In addition, the processing means includes a crystal oscillator 36 which supplies a reference frequency input to the microprocessor to control the timing of operations it performs. This input is, for example, 16 MHz.

Figure 6:
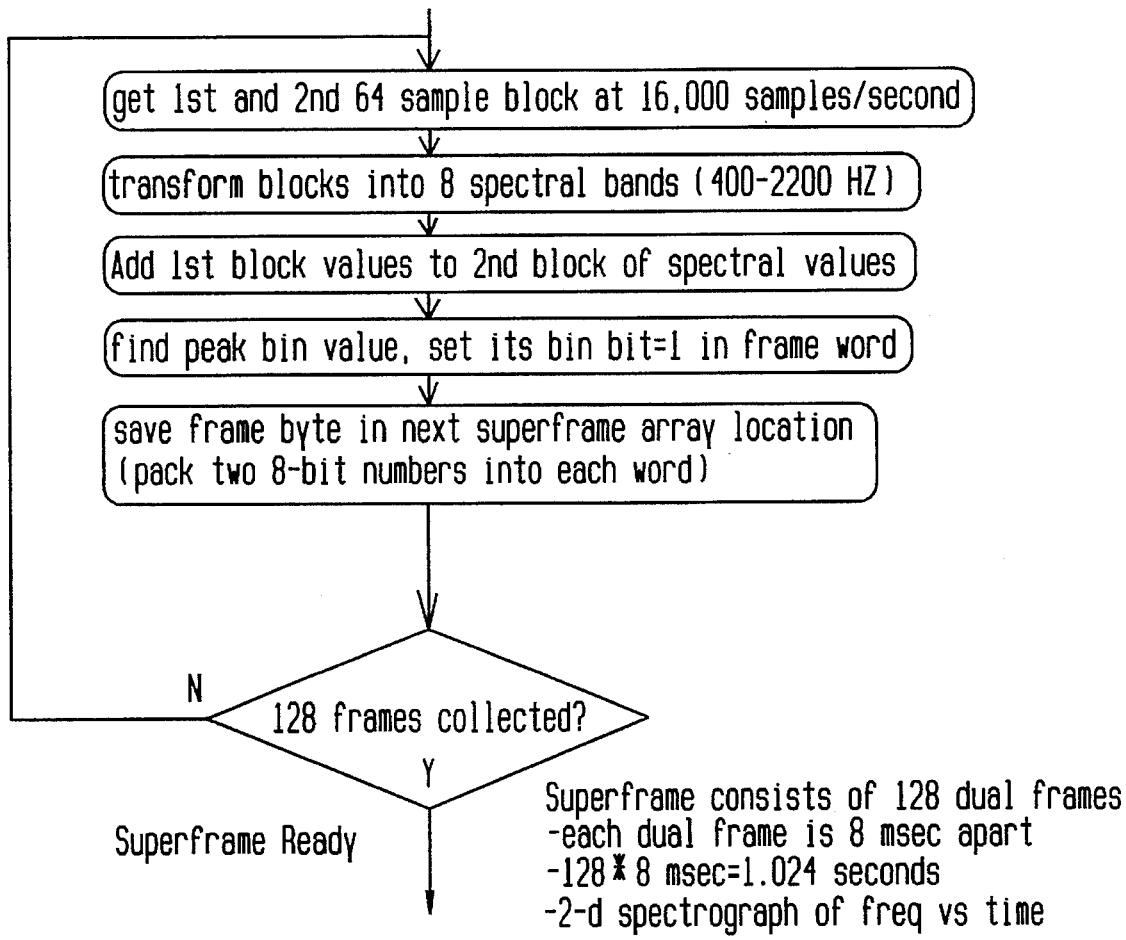
FIG. 6 is a flow chart of the operation of the signal processing.

Microprocessor 32 is programmed to perform a two-dimensional autocorrelation process. The first steps in performing this process are shown in FIG. 6. This process not only improves the signal-to-noise ratio of the audio input to processing means 22, but also converts a two-dimensional spectrograph (i.e., frequency vs. time) to a one-dimensional 64 point array. First, the analog output audio signal from operational amplifier 28 is converted to a digital signal by converter 30. The resulting digital signal is then sampled at a rate of, for example, 16,000 samples/second by microprocessor 32. A data frame comprising 64 digitized, scaled samples is created by this sampling process. Conversion of the frame to the frequency domain is done using a discrete Fourier transform (DFT) such as a Goertzel DFT. The transform is used to determine the energy content of eight (8) audio frequency bands. These bands are each 200 Hz wide and extend from 400 Hz at the low end of the audio spectrum, to 2200 Hz at the upper end thereof. This range of bands covers the siren frequencies. On the 64th sample taken, a final frame magnitude calculation is made.

For the sampling and transform process, eight magnitude values, one for each band, are stored in an array. Next, the sampling and transform process is repeated to produce a second frequency domain data frame also containing 64 scaled samples. The values in the respective frame locations are then added together to produce a dual frame whose values represent a two frame spectral average of the digitized audio input signal. The advantage of this procedure is a significant increase in the signal-to-noise ratio; for example, a 1,414 ratio.

The resultant dual frame, which has 8 16-bit values, is now examined to locate the data bin within the frame having the peak data value. Once found, the peak value is used to establish a threshold by which the data can be scaled from a multiple bit (e.g., 16 bit) value, down to a single bit value. Compression allows use of low cost DSP's which have a small amount of random access memory (RAM) to store data. Now, for each eight values in the frame, a comparison is made to determine if the combination of the values equals the established threshold. If so, a binary "1" is assigned to that set of eight values. If not, a binary "0" is assigned. Upon completion of this comparison, the binary bits are concatenated into a single 8-bit byte. Pairs of these 8-bit bytes are then combined to form a single 16-bit word. A superframe F1–F4, see FIGS. 7A–7F, is now created in which this 16-bit word is stored in one of the superframe locations L. The above steps are repeated until 128 frames are collected, each frame including 64 two-byte packed words. This procedure has two advantages. First, there is a data compression of 16:1. Second, the byte packing halves the data memory required to store a superframe F in the microprocessor memory.

Once a superframe is created, a two-dimensional autocorrelation is performed using the superframe F data. First, microprocessor 32 unpacks the 64 two-byte packed words into 128 16-bit words. A copy of superframe F1–F4 is overlaid on an original superframe and the two are compared. The number of location matches are counted and that value is saved in a first location in an autocorrelation buffer B within the microprocessor.

Next, the copy of superframe F is shifted to the right one position and the matching locations are again counted. This value is saved in a second autocorrelation buffer location. This shifting, counting and storing sequence is continued until the duplicate copy is "wrapped" around to again be aligned with the first column of the original superframe. This means 64 shifts have occurred and a 64 point autocorrelation buffer has been created. FIGS. 7A–7D illustrate the above described steps with respect to various types of sirens, and noise. Three types of siren sounds (WAIL, YELP, and HYPERYELP) are respectively shown in FIGS. 7A, 7B, and 7D. Noise is shown in FIG. 7C. The result of the autocorrelation for all for situations is graphically illustrated in each Figure. This graph represents a plot of the match values stored in the autocorrelation buffer within the microprocessor.

Figure 7A:
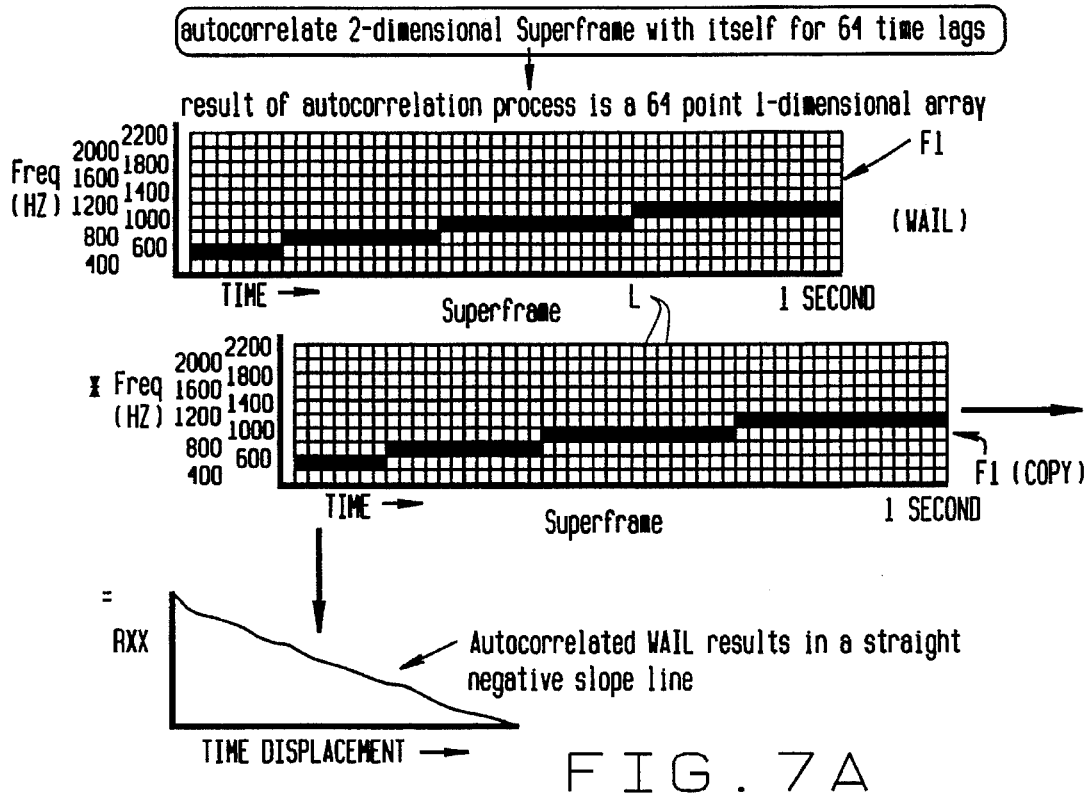
FIGS. 7A–7D illustrate autocorrelation processes performed by the signal processor for different type of sirens and noise to determine when a warning should be provided to the driver.
Figure 7B:
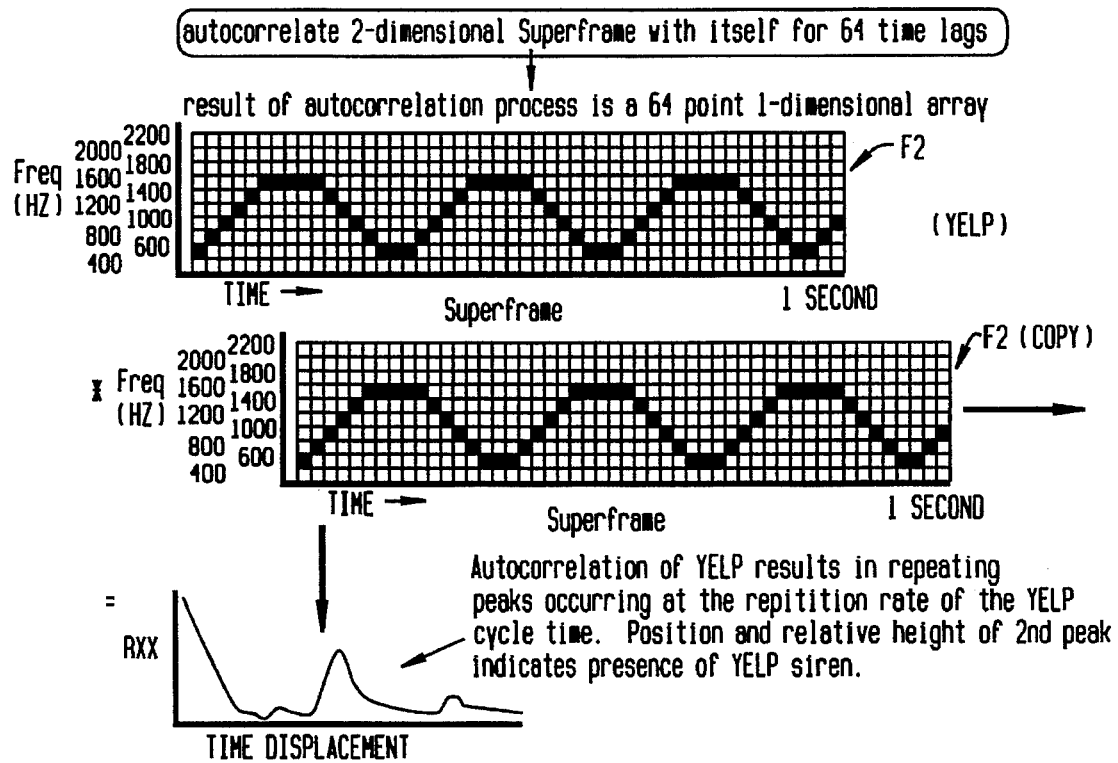
Figure 7C:
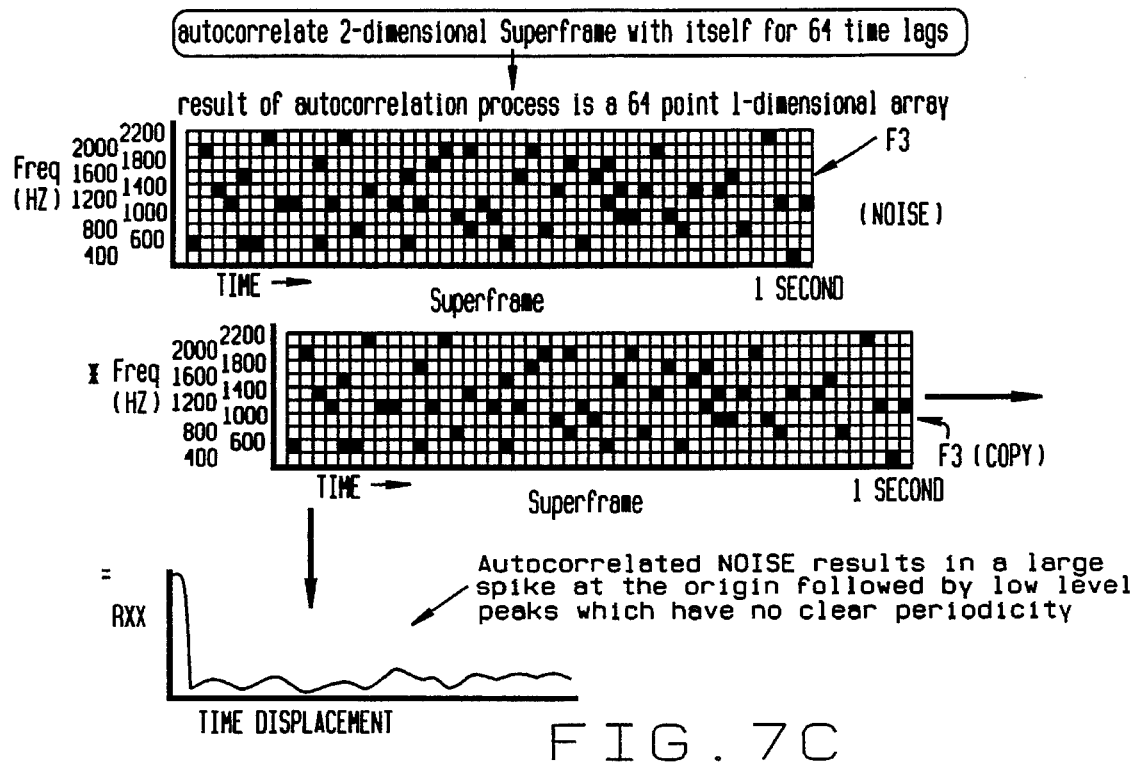
Figure 7D:
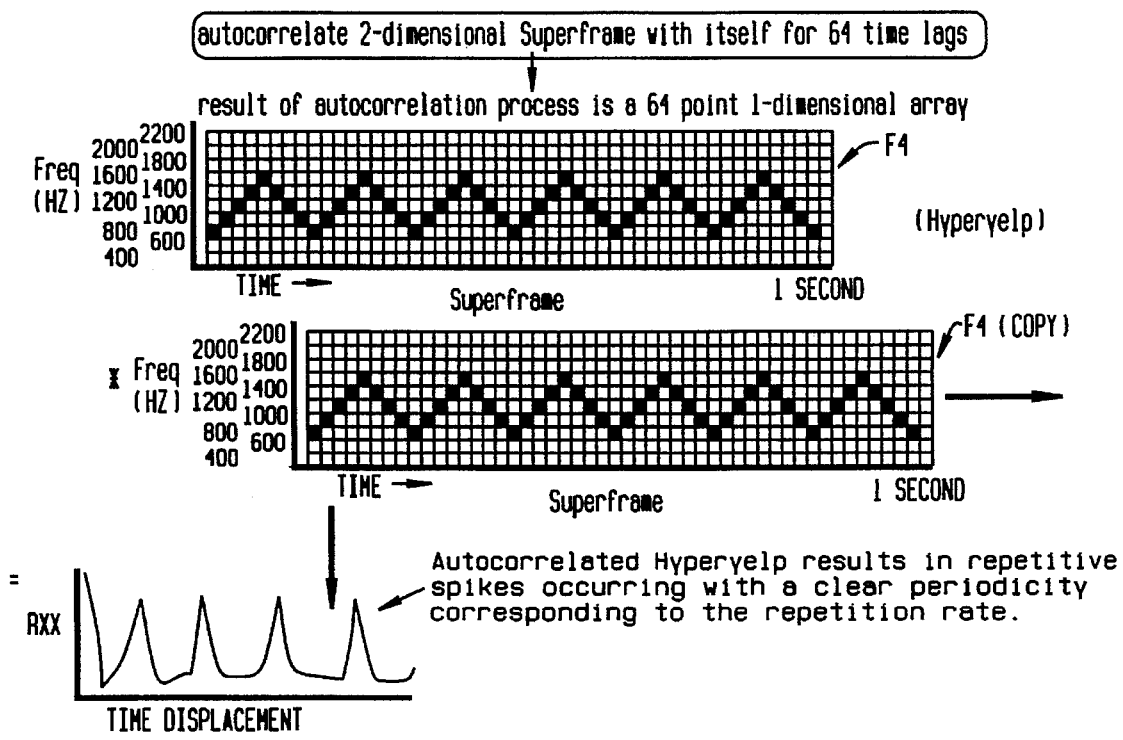

Referring to FIG. 7A, if the siren sound is a WAIL, the values stored in the autocorrelation buffer represent a straight line plot having a negative slope. As shown in FIG. 7B, if the siren sound is a YELP, the values stored in the buffer produce a series of peaks when plotted, the peaks occurring at a repetition rate corresponding to the cycle time of siren. The HYPERYELP siren sound plotted in FIG. 7D is similar to that of the YELP plot in FIG. 7B. The difference is that the peaks in the HYPERYELP plot are much closer together which is indicative of the shorter cycle time for this type siren. Lastly, the NOISE plot of FIG. 7C illustrates a typical kind of white noise situation in which, after an initial spike, there is no clearly defined peak, but rather a generally straight line having minor peaks and valleys.

Figure 8:
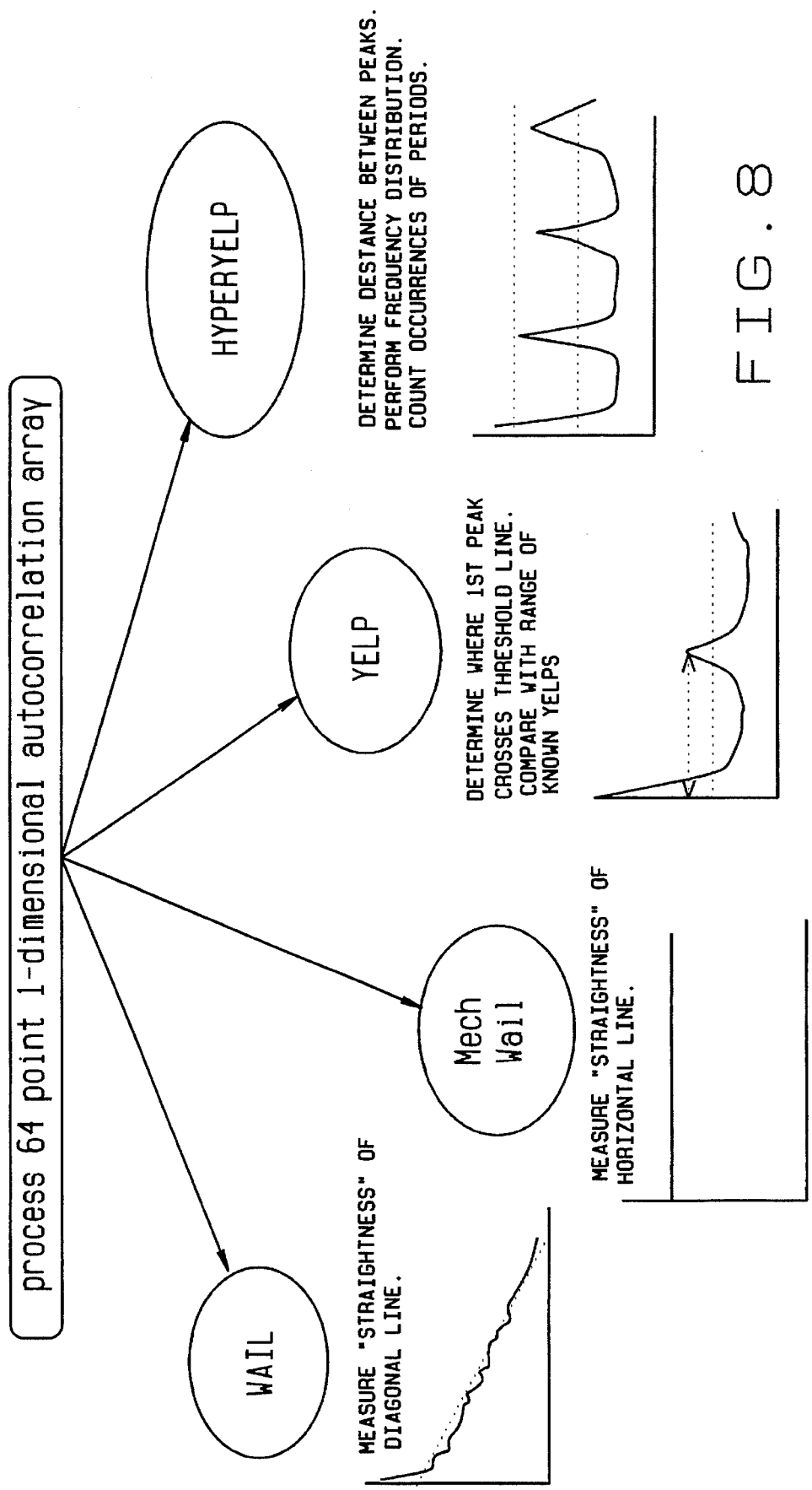
FIG. 8 illustrates a third step in the signal processing method of the invention.

Referring to FIG. 8, after the autocorrelation procedure is complete and the autocorrelation buffer filled, microprocessor 32 examines the data stored in the buffer to determine if it meets the criteria for one of the four conditions described with respect to FIGS. 7A–7D. First, the microprocessor determines if the buffer data meets the conditions for a YELP. To do this, the microprocessor establishes a peak threshold based on the maximum and minimum values in buffer B. For example, the threshold is set as:

THRESHOLD=((⅔)(max.−min.)/(min.)), with the distance between max. and min. exceeding a value of 75. In YELP processing, the position of the peak P is noted. This peak should occur between frame positions 26 and 40, the frame having 64 positions based upon the previous discussion. The range of positions 26–40 is important because it represents the range of positions for the repetition rate for known YELP sirens. If a peak is found within this acceptance range, a visual and audio indication is provided as described hereinafter. To insure that the peak is true peak, and not simply random noise, the microprocessor tests to verify that the cumulative vertical error from the first data point to the peak location is less than five times the difference between the maximum and minimum values used to establish the threshold. This test establishes that there is a smooth transition to the peak and not simply a random noise spike.

If a YELP is not detected, microprocessor 32 next determines if the audio signal is a WAIL. As noted, a WAIL is represented by a straight line of negative slope. To determine if this is so, the microprocessor calculates an error metric. It does this by summing the absolute value of the difference of each pair of data points in buffer B. A horizontal, straight line has a zero error value. For a diagonal line, the error value corresponds to the vertical distance between the maximum value and minimum value. WAIL detection is based upon a predetermined maximum allowable error value coupled with a threshold representing the distance between the maximum and minimum values.

After checking for a YELP or WAIL, the microprocessor next looks for a HYPERYELP. HYPERYELP detection involves a comparison performed on the data in buffer B. The comparison involves looking at the zero-crossing points of the periodically occurring spikes indicative of a HYPERYELP siren. The distance between each zero-crossing point (i.e., the change in slope from positive to negative which occurs at a peak) is noted, and these distance values are stored in period distribution array. The microprocessor then tests the array to ascertain the frequency distribution of the period. The array may, for example, be limited as to the range of frequency or period values which are allowable. These values are based on known HYPERYELP sirens. A HYPERYELP is considered to be occurring when two adjacent values are added and their sum exceeds a predetermine threshold value.

In addition to the above three types of siren sounds, microprocessor also checks to see if a mechanical wail siren sound is being made. It does this by checking for a horizontal, straight line. A straight line occurs when the mechanically generated wail has a constant frequency for an extended period of time. If the frequency changes over time, this is detected in the WAIL detection process described above. As with the WAIL process, an error test is made of the buffer B values. A mechanical wail is considered to occur when the cumulative error falls to a near zero value.

Figure 9:
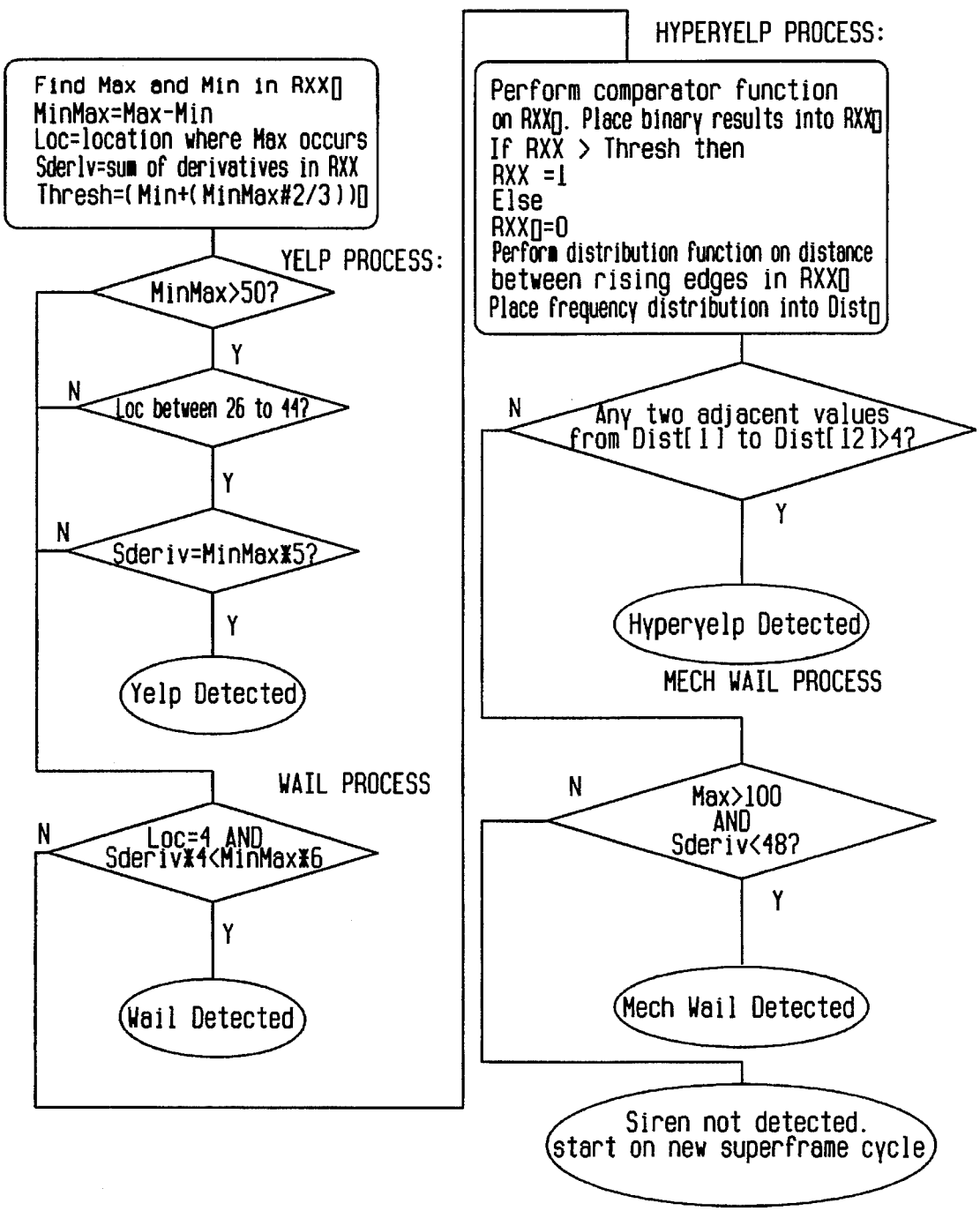
FIG. 9 is a flow chart of a third step of the process.

Referring to FIG. 9, the above described process is shown as a flow graph. Regardless of which type siren is sounding, if the above criteria for any of the four types of sirens is met, microprocessor 32 switches a transistor Q1 (see FIG. 5) into conduction, thus constituting a warning signal. Transistor Q1 now provides a ground path for a light emitting diode (LED) D1, and a tone generator or beeper B1. The LED is, for example, installed on the dashboard of the vehicle where it is readily seen by the driver. The LED therefore comprises light indication means for providing a visible signal to the driver of the proximity of an emergency vehicle so the driver can take appropriate action to avoid it. Further, the beeper may also be located on the dash so its tone is audible to a hearing capable person also riding in the vehicle.

The LED remains illuminated so long as the microprocessor's continued processing of audio input signals identifies one of the four siren criteria previously discussed. If the siren stops, or the emergency vehicle moves away from the hearing impaired driver, so the siren pattern is no longer discernible, the microprocessor switches the transistor out of conduction. The LED goes out, and the beeper no longer emits a tone.

Lastly, the processing means includes a diagnostic port 38 for connection of an external test device (not shown) to the processing means.

Figure 10:
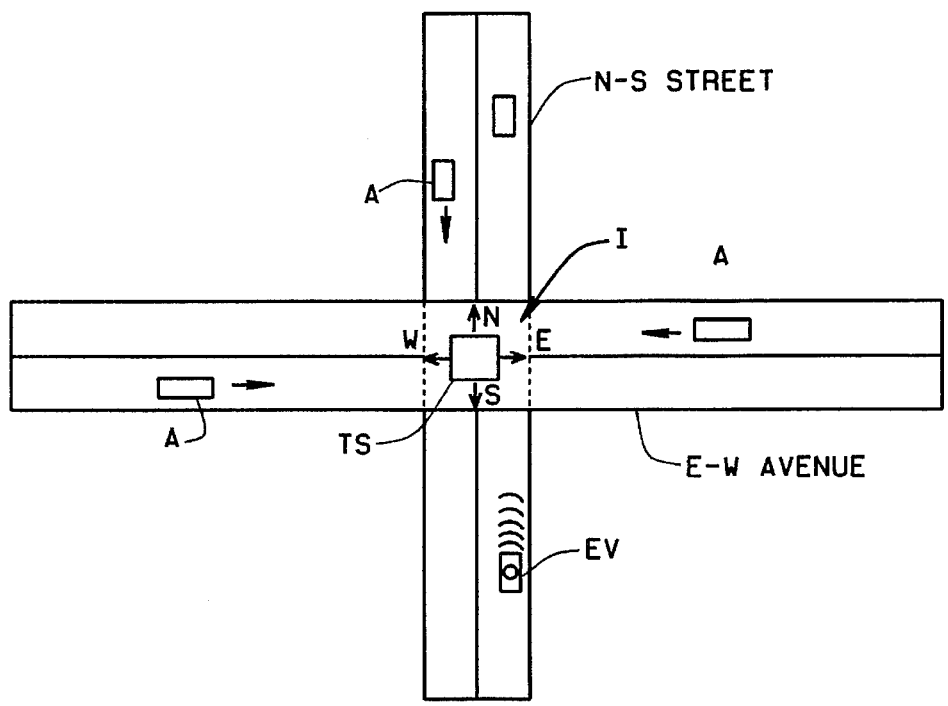
FIG. 10 is a representation of a traffic intersection having a traffic light; and, FIG. 11 is a block diagram illustrating use of the system with a pre-emptive traffic light controller to control traffic flow upon an emergency vehicle approaching the intersection and sounding its siren.
Figure 11:
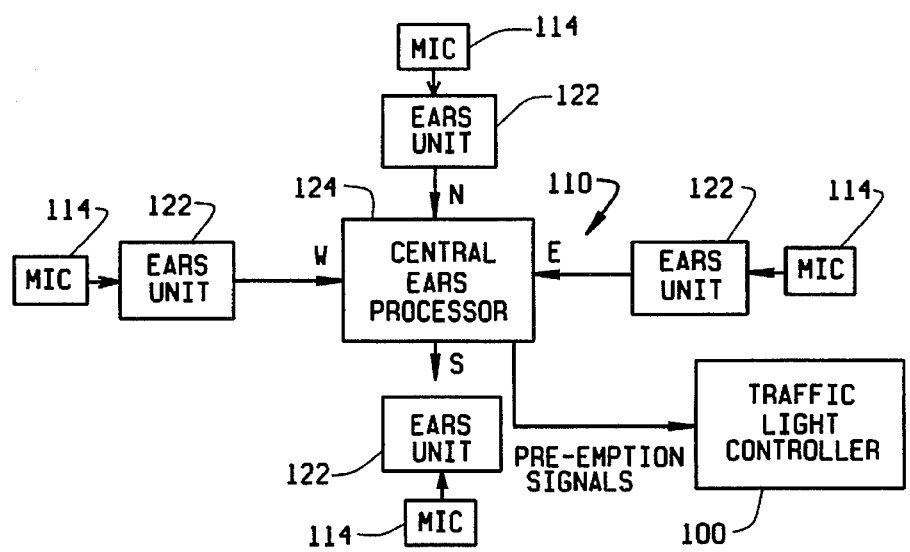

Referring to FIGS. 10 and 11, another embodiment of the system of the present invention, as indicated generally 110, is used as a pre-emptive traffic signal controller responsive to the siren of an emergency vehicle for overriding a traffic light controller 100 so as to insure that the emergency vehicle has a green light to proceed through an intersection and to stop cross traffic. Controller 100 typically controls a traffic signal TS located at the intersection I of two streets, for example. System 110 includes a directional microphone unit 114 and signal processor 122 for each approach to the intersection. The microphone 114 and signal processor 122 are generally as previously described and thus will not be described in detail. As noted, microphone 114 is a directional microphone. Preferably, the microphone only detects the sirens of emergency vehicles approaching the intersection along the street with which the microphone is aligned. The output from each of the four processors 122 is supplied to a central processor unit 124. The central processor is, in turn, connected to traffic light controller 100.

As depicted in FIG. 10, various vehicles are approaching intersection I. Most of these vehicles are automobiles A; however, one is an emergency vehicle EV proceeding north bound on North and South Street. When the appropriate microphone/processor unit 114/122; i.e., the directional microphone searching for northbound emergency vehicle approaching the intersection from the south detects the siren sound, this information is relayed to controller 100 by central processor 124. Controller 100 is responsive to the input to command the traffic signal to provide a stop signal (i.e., a red light) to traffic in all the lanes approaching the intersection except that in which the emergency vehicle is traveling. As a result, the emergency vehicle is given the right-of-way through the intersection thus lessening the potential for accidents involving the emergency vehicle.

What has been described is an early alert response system for use by hearing impaired or other drivers of automotive vehicles. The response system is installed on a vehicle with a microphone of the system being installed on the outside. The microphone is located so to reduce both wind turbulence noise and vehicle vibration noise. The system is responsive to the presence of a siren sound to provide a clear, visual indication to the driver. A warning indication is provided the driver in ample time to allow him or her to take appropriate action. The response system detects any of many different sirens used by different emergency vehicles. A spectral averaging process is used to enhance the signal-to-noise of detected siren sounds to better obtain a warning indication and prevent false alarms. The response system continuously examines different frequency bands to ascertain if a siren is in the vicinity of the vehicle. The system employs state-of-the-art autocorrelation and analysis recognition techniques to distinguish between different siren patterns and noise. Any of four different types of sirens are recognizable based upon pattern recognition criteria unique to each. While described with respect to alerting hearing impaired drivers to the presence of emergency vehicles, the system, with minor modifications, is useful in other areas as well. The system could, for example, be installed at a traffic light to control the lights when a siren sounds an approaching emergency vehicle. In the medical area it can be used as a sleep apnea monitor to sound an alert when a child stops breathing. It can be used as a pool monitor to sound an alarm when a child or animal falls into an unattended swimming pool. It could acoustically monitor blood flow and sound an alarm when the flow is outside prescribed limits.

In view of the foregoing, it will be seen that the several objects of the invention are achieved and other advantageous results are obtained.

As various changes could be made in the above constructions and methods without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A warning system responsive to an audio signal for providing a warning signal comprising:

means for receiving an audio frequency signal, the audio frequency signal being in one of a band of frequencies, and the receiving means also simultaneously receiving other audio frequency signals;

signal processing means for processing all of the received audio frequency signals, said processing means including means for converting the received audio frequency signals to digital signals, sampling the digital signals at a predetermined sample rate, scaling the resulting samples as a function of an average signal energy value, transforming the scaled samples into a transform coveting a range of audio frequencies within the band of frequencies and means for correlating the resulting, transform to determine if a received audio frequency signal represents an audio signal to which the system should respond;

comparing means for comparing the autocorrelation with a set of criteria representing an audio frequency signal to which the system should respond to determine if such an audio frequency signal has been received; and, means for generating said warning signal in response to the audio frequency signal being received, the signal processing means generating the warning signal when the correlation means indicates a received audio frequency signal corresponds with the audio signal to which the system should respond.

2. The system of claim 1 further including a housing in which a microphone is installed, the housing being located such that the microphone encounters a minimum of wind turbulence and vibration, and the microphone comprising the means for receiving the audio frequency signal.

3. The system of claim 2 further including mounting means for installing the housing in a desired location.

4. The system of claim 2 wherein the receiving means further includes frequency sensing means.

5. The system of claim 4 wherein the frequency sensing means includes a piezoelectric transducer resonant at a predetermined audio frequency.

6. The system of claim 5 wherein the receiving means includes an operational amplifier to which the output of the transducer is supplied, the output of the operational amplifier being the input frequency signal to the processing means.

7. The system of claim 1 wherein the converting means includes an analog-to-digital converter.

8. The system of claim 7 wherein the correlation means includes microprocessor means for performing an autocorrelation of the converted signals, to produce an audio plot the characteristics of which are analyzed to determine if the received audio frequency signal includes a siren sound or noise, and if a siren sound, the type thereof, and the comparing means includes means for comparing the characteristics of the audio plot with the set of audio frequency signal criteria.

9. The system of claim 8 wherein the means for generating said warning signal includes a lamp which is normally extinguished and which is located so to be readily seen by someone to be warned by the system, the lamp being illuminated by an output from the processing means when a siren sound detection occurs.

10. The system of claim 9 further including an audio alarm sounded by an output from the processing means to indicate that an audio sound to which the system responds has been received, the audio alarm being a sound different from that to which the system responds.

11. The system of claim 8 further including timing means providing timing inputs to the correlation means.

12. The system of claim 1 further including power supply means for supplying power to the receiving means, processing means, and visual indication means.

13. A method of warning a person of a condition by detecting a sound indicative that the condition exists comprising:

receiving an audio frequency signal indicative of the condition, the frequency signal being in one of a band of audio frequencies, and the receiving means also receiving other audio frequency signals;

processing all received audio frequency signals including converting the received audio frequency signals to digital signals, sampling the digital signal at a predetermined rate, scaling the resulting samples as a function of an average energy value, transforming the scaled samples into a transform covering a range of audio frequencies within the band of frequencies, and performing an autocorrelation on the resulting transform to ascertain if the received audio frequency signal represents a sound for which a warning should issue;

comparing the autocorrelation with a set of criteria representing an audio frequency signal to determine if an audio frequency signal representing the condition has been received and, providing a visible signal to the person that the condition exists so the person can take action appropriate with regard to the condition when the processing indicates the sound detected signals the presence of the condition for which action should be taken.

14. An early warning system for visually informing the hearing impaired driver of an automotive vehicle of the proximity of an emergency vehicle by detecting a siren being sounded by the emergency vehicle comprising:

means for receiving an audio frequency signal transmitted by the siren, the frequency signal being in one of a band of frequencies, and the receiving means also receiving other radio frequency signals;

signal processing means for processing all received audio frequency signals, said processing means including means for converting the received audio frequency signals to digital signals, and sampling the digital signals at a predetermined rate, scaling the resulting sample as a function of an average signal energy value, transforming the scaled samples into a transform covering a range of audio frequencies with the band of frequencies, and means performing an autocorrelation of the resulting, transform and comparing the results thereof to predetermined set of criteria representing the sounds made by various sirens; and, visual indication means for providing a visible signal to the driver of the proximity of an emergency vehicle so the driver can take appropriate action to avoid the emergency vehicle, the signal processing means illuminating the visual indication means when the comparison indicates a received signal corresponds with the sound made by an emergency vehicle siren.

15. The system of claim 14 wherein the receiving means includes a microphone installed on the vehicle, and a housing in which the microphone is mounted, the housing being mounted on the exterior of the vehicle in a position where the microphone encounters a minimum of wind turbulence and vehicle vibration, and the housing including mounting means for mounting the housing on the vehicle.

16. The system of claim 14 wherein the receiving means includes a microphone and frequency sensing means.

17. The system of claim 16 wherein the frequency sensing means includes a piezoelectric transducer resonant at a predetermined audio frequency.

18. The system of claim 14 wherein the converting means includes the analog-to-digital converter.

19. The system of claim 18 wherein the autocorrelation means includes microprocessor means for performing an autocorrelation of the converted signals, said autocorrelation converting a two-dimensional frequency and time plot to a one-dimensional plot the characteristics of which are compared with the predetermined set of criteria to determine if a received audio signal includes a siren sound or noise, and if a siren sound, the type thereof.

20. The system of claim 19 wherein the visual indication means includes a lamp which is normally extinguished and which is located on a dashboard or instrument panel of the vehicle where it can be readily seen by the driver, the lamp being illuminated by an output from the processing means when a siren sound is detected.

21. The system of claim 20 further including an audio alarm responsive to an output from the processing means for providing an audio indication that a siren sound has been received, said audio alarm informing a hearing person in the vehicle of the proximity of the siren so they can inform the driver.

22. A system responsive to a warning siren of an emergency vehicle approaching an intersection controlled by a traffic signal and a traffic signal controller for pre-empting the traffic signal so as to insure that the emergency vehicle has the right of way through the intersection and to insure that cross traffic is stopped, said system comprising:

one or more sensing units for monitoring audio signals at the intersection;

processing means for processing all of the audio signals monitored by said sensing units, said signal processing means including means for converting the monitored audio signals to digital signals, sampling the digital signals at a predetermined rate, scaling the resulting samples as a function of an average signal energy value, and for transforming the scaled samples into a transform covering a range of audio frequencies;

means for storing one or more predetermined audio signals corresponding to the audio signal emitted by an emergency vehicle siren;

means for determining if said digital signals from said sensing units correlate to one of said predetermined audio signals from an emergency vehicle siren;

means for generating an output signal responsive to a determination that an emergency vehicle is approaching the intersection while sounding its siren; and means responsive to said output signal for pre-empting said traffic signal controller so as to insure that said traffic signal allows said emergency vehicle the right of way through said intersection and stops cross traffic.

23. The traffic signal pre-emptive system as claimed in claim 22 further including means for determining from which direction the emergency vehicle sounding its siren is approaching the intersection and for controlling said traffic signal accordingly to insure that said emergency vehicle has the right of way through said intersection and that cross traffic is stopped.

24. A method of pre-empting a traffic signal at an intersection controlled by a traffic signal controller in response to an audio warning siren signal emitted by an emergency vehicle approaching the traffic signal so as to insure that the emergency vehicle has the right of way through the intersection and that cross traffic is stopped, said method comprising:

monitoring audio signals at the intersection:

processing said audio signals received at the intersection including converting said audio signals to digital signals, sampling the digital signals at a predetermined rate, scaling the resulting signals as a function of an average signal energy value, and transforming the scaled samples into a transform covering a range of audio frequencies;

comparing said transform of said audio signals received at the intersection to one or more predetermined signals corresponding to the audio signal emitted by an emergency vehicle siren;

generating a signal in response to determining that the audio signal being received from said intersection corresponds to said predetermined emergency vehicle siren signal; and pre-empting the control of said traffic signal so as to insure that said emergency vehicle has the right of way through the intersection and that cross traffic is stopped.

25. The method of claim 24 further comprising the step of determining from which direction the emergency is approaching the intersection and controlling the traffic signal accordingly to insure that said emergency vehicle has the right of way through the intersection and than cross traffic is stopped.

26. A method of warning the hearing impaired driver of an automotive vehicle of the proximity of an emergency vehicle by detecting a siren being sounded by the emergency vehicle comprising:

receiving an audio frequency signal transmitted by the siren, the frequency signal being in one of a band of audio frequencies, and the receiving means also receiving other audio frequency signals;

processing all of the received audio frequency signals including converting the received audio frequency signals to digital signals, sampling the digital signals at a predetermined sample rate, scaling the samples based on an average signal energy value, calculating a discrete Fourier Transform from the scaled sample information, the Fourier transform covering a plurality of spectral bands in the audio frequency and performing an autocorrelation on the result of the calculated transform to ascertain if a received audio frequency signal represents the sound made by a siren;

comparing the autocorrelation with a set of criteria representing audio frequency signals for sirens to determine if a siren sound has been received; and, illuminating a light to provide a visible signal to the driver of the proximity of an emergency vehicle so the driver can take appropriate action to avoid the emergency vehicle, when the processing indicates the sound was made by an emergency vehicle siren.

27. The method of claim 26 further including installing a microphone on the exterior of the automotive vehicle in a position where the microphone encounters a minimum of wind turbulence and vehicle vibration, particulary when the vehicle is moving at highway speeds.

28. The method of claim 27 further including frequency sensing with a piezoelectric transducer resonant at a predetermined audio frequency.

29. The method of claim 28 further including supplying the transducer outputs to an operational amplifier, and supplying an output of the operational amplifier as an input frequency signal for processing.

30. The method of claim 26 wherein the signal processing further included adding the results of a first discrete Fourier Transform with that of a second to obtain a frame of data comprising data bits representing spectral average values.

31. The method of claim 30 wherein the signal processing further includes:

analyzing the data frame to obtain the peak value of the data contained therein;

compressing the data bits in the data frame to a single bit the value of which is a function of the peak value;

repeating the above two steps for a succession of data frames; and, concatenating the results into a single multi-bit data word.

32. The method of claim 30 further including concatentating a sequence of data words into a superframe of data.

33. The method of claim 32 wherein the signal processing further includes:

performing an autocorrelation between the superframe and a copy thereof;

comparing the results of the autocorrelation with known indicia of various siren sounds; and, illuminating the lamp if the comparison indicated that the received audio signal is a siren sound.

* * * * *